I. L. G. RICE.
Car Brake.
No. 108,830.  Patented Nov. 1, 1870.
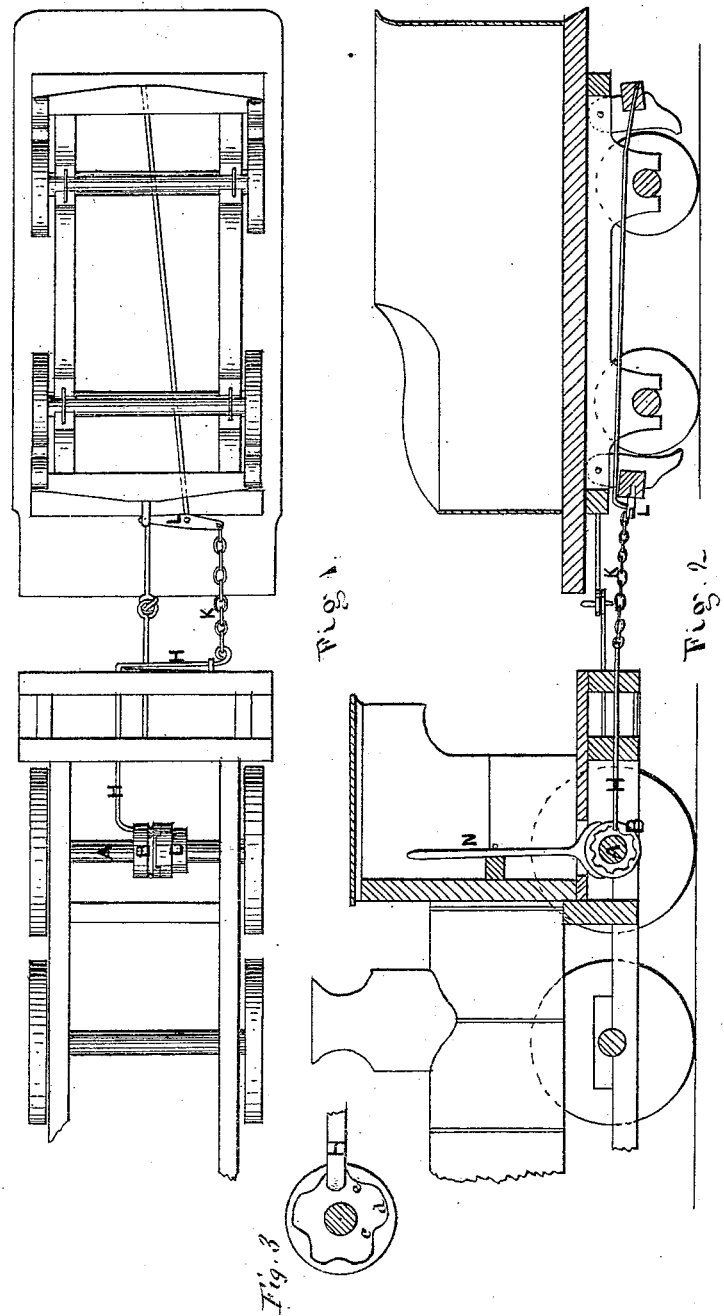

United States Patent Office.

ISRAEL L. G. RICE, OF CAMBRIDGE, MASSACHUSETTS.

Letters Patent No. 108,830, dated November 1, 1870.

IMPROVEMENT IN RAILWAY-CAR BRAKES.

The Schedule referred to in these Letters Patent and making part of the same.

*To all whom it may concern:*

I, ISRAEL L. G. RICE, of Cambridge, in the county of Middlesex and State of Massachusetts, have invented certain new and useful improved Apparatus for Operating Brakes for Railway-Cars, &c., of which the following is a specification.

The Nature and Object of the Invention.

The nature of my invention consists in connecting with the axle of a locomotive a cam or series of cams, said cam being so arranged, in connection with a clutch device and the axle, that the cam may revolve with the axle or not, at the will of the driver, and in combining with this cam a rod, which connects with the break-levers of the following cars, the cam being so made that it will only draw the rod a certain distance, thus producing a certain pressure upon the brakes. Then the rod is let off, and the brake relieved, until the cam has time to complete a whole or part revolution, so as to bring the same cam or another to bear on the rod.

The object of my arrangement being to make a brake that shall be operated by the engine, yet have the power so applied that it may be self-limiting.

Description of the Accompanying Drawing.

Figure 1 is a plan showing the under side of an engine and tender-car.

Figure 2 shows a vertical section of the same.

Figure 3 shows an enlarged elevation of the cam.

General Description.

A represents one of the driving-axles of the engine, which carries the fixed disk D, and also the wheel or clutch B.

One side of this clutch B has notches to correspond to similar notches on the fixed disk D, so that when the clutch B is moved by the lever N against the disk D it will have to revolve with the axle.

The other side of the clutch B is formed, as shown in fig. 3, into a series of cams, *c d e*.

H is a rod, bent, as shown in figs. 1 and 2, so that it may be operated upon by the cams.

This rod H is connected by a chain, K, to the brake-lever L.

This cam-wheel B and rod H, together with the brake-attachment, are so arranged that when the brake is drawn up to a certain pressure the rod will slip by the cam and the pressure on the brake will be removed until another cam begins to act.

By this arrangement the brake-pressure exerted by the engine is not excessive or constant, and the action will be so gradual as not to cause accidents.

The intermittent action of the brake is one of the principal features of my invention.

I claim as my invention.

The cam-wheel B, constructed as described, in combination with the disk D, axle A, rod H, and brake-lever L, as and for the purpose set forth.

ISRAEL L. G. RICE.

Witnesses:
 FRANK G. PARKER,
 WILLIAM EDSON.